US010080155B1

(12) United States Patent
Lee et al.

(10) Patent No.: US 10,080,155 B1
(45) Date of Patent: Sep. 18, 2018

(54) DYNAMIC DATA COLLECTION IN A WLAN

(71) Applicant: Arris Enterprises LLC, Suwanee, GA (US)

(72) Inventors: Yi-Nan Lee, Milpitas, CA (US); Kai-Hsiung Cheng, Yilan County (TW); Chien Cheng Ming, Taoyuan (TW); Sudip Ghosal, Saratoga, CA (US); Ching-Hung Chen, Taipei (TW)

(73) Assignee: Arris Enterprises, LLC, Suwanee, GA (US)

( * ) Notice: Subject to any disclaimer, the term of this patent is extended or adjusted under 35 U.S.C. 154(b) by 0 days.

(21) Appl. No.: 15/461,032

(22) Filed: Mar. 16, 2017

(51) Int. Cl.
| H04W 24/10 | (2009.01) |
| H04L 12/863 | (2013.01) |
| H04L 12/26 | (2006.01) |
| H04W 84/12 | (2009.01) |
| H04W 88/08 | (2009.01) |
| H04W 88/12 | (2009.01) |

(52) U.S. Cl.
CPC ............ *H04W 24/10* (2013.01); *H04L 43/06* (2013.01); *H04L 47/6215* (2013.01); *H04L 47/50* (2013.01); *H04L 47/6255* (2013.01); *H04W 84/12* (2013.01); *H04W 88/08* (2013.01); *H04W 88/12* (2013.01)

(58) Field of Classification Search
CPC .................. H04W 24/10; H04L 47/50; H04L 47/62–47/6295; H04L 43/06
See application file for complete search history.

(56) References Cited

U.S. PATENT DOCUMENTS

| 5,124,690 | A | * | 6/1992 | Ito | .......................... G03G 15/502 345/618 |
| 9,622,044 | B2 | * | 4/2017 | Brisebois | ............... H04W 4/028 |
| 2004/0044497 | A1 | * | 3/2004 | Rogers | ..................... B67D 7/08 702/156 |
| 2007/0041330 | A1 | * | 2/2007 | Bostica | ................. H04W 24/00 370/252 |
| 2007/0143062 | A1 | * | 6/2007 | Memmott | .............. G05B 15/02 702/136 |
| 2007/0281683 | A1 | * | 12/2007 | Goulet | .................. H04W 24/04 455/423 |
| 2008/0253314 | A1 | * | 10/2008 | Stephenson | ........... H04W 24/08 370/326 |
| 2010/0159945 | A1 | * | 6/2010 | Brisebois | ................ H04W 4/02 455/456.1 |

(Continued)

*Primary Examiner* — Duc M Nguyen
(74) *Attorney, Agent, or Firm* — Steven Stupp

(57) ABSTRACT

A controller and one or more access points that dynamically modify data collection in a system that includes a WLAN is described. In particular, during operation the access point may receive data for a type of data from an electronic device in the WLAN. Then, access point may aggregate the data based on an aggregation interval, where the aggregation interval is predefined for a group of types of data that includes the type of data. Moreover, the access point may transmit the aggregated data to the controller based on a reporting interval, where the reporting interval is predefined for the group of types of data. Next, the access point may receive an instruction from the controller to modify the aggregation interval and/or the reporting interval for the group of types of data. Furthermore, the access point may modify the aggregation interval and/or the reporting interval based on the instruction.

20 Claims, 6 Drawing Sheets

(56) References Cited

U.S. PATENT DOCUMENTS

| | | | |
|---|---|---|---|
| 2010/0325232 A1* | 12/2010 | Zhang | H04H 20/57 709/206 |
| 2013/0095846 A1* | 4/2013 | Brisebois | H04W 16/28 455/456.1 |
| 2014/0254359 A1* | 9/2014 | Alisawi | H04W 28/0284 370/230 |
| 2015/0199253 A1* | 7/2015 | Sprague | G06F 11/3419 709/224 |

* cited by examiner

| ZONE | ACCESS POINTS | SLA |
|---|---|---|
| ZONE 610-1 | ACCESS POINTS 612-1 | SLA 614-1 |
| ZONE 610-2 | ACCESS POINTS 612-2 | SLA 614-2 |
| ZONE 610-3 | ACCESS POINTS 612-3 | SLA 614-3 |

DYNAMIC DATA COLLECTION IN A WLAN

BACKGROUND

Field

The described embodiments relate to techniques for communicating information among electronic devices. In particular, the described embodiments relate to techniques for dynamically changing data-collection parameters in network, such as a wireless local area network (WLAN).

Related Art

Many electronic devices are capable of wirelessly communicating with other electronic devices. In particular, these electronic devices can include a networking subsystem that implements a network interface for: a cellular network (UMTS, LTE, etc.), a WLAN (e.g., a wireless network such as described in the Institute of Electrical and Electronics Engineers (IEEE) 802.11 standard or Bluetooth from the Bluetooth Special Interest Group of Kirkland, Wash.), and/or another type of wireless network. For example, many electronic devices communicate with each other via WLANs using an IEEE 802.11-compatible communication protocol (which are sometimes collectively referred to as 'Wi-Fi').

Many service providers use one or more controllers to support large numbers of access points and electronic devices in WLANs. For example, the one or more controllers may, via the access points in the WLANs, monitor data associated with applications executing on the electronic devices. In particular, the one or more controllers may implement a network management system that collects information (such as statistics) about the applications and the electronic devices.

However, it can be difficult to scale the network management system. In particular, the one or more controllers may support tens of thousands of access points, hundreds of thousands of electronic devices and millions of instances of applications. When the electronic devices report measured data, the one or more controllers may be unable to handle the data volume efficiently, especially on a continuous basis. The resulting backlog (such as during certain load conditions) can cause delays in data collection, which may degrade the data precision, data sampling and/or may result in lost data. This degradation in data quality may make the data less useful, which in turn may be frustrating to network administrators.

SUMMARY

The described embodiments relate to an access point that dynamically modifies data collection. This access point includes an interface circuit that communicates with a controller and an electronic device in a WLAN. During operation, the access point may receive, from an input to the access point, data for a type of data from the electronic device based on a measurement interval, where the measurement interval is predefined for a group of types of data that includes the type of data. Then, the access point may aggregate the data based on an aggregation interval, where the aggregation interval is predefined for the group of types of data. Moreover, the access point may transmit, to an output of the access point, the aggregated data for the controller based on a reporting interval, where the reporting interval is predefined for the group of types of data. Next, the access point may receive, from the input to the access point, an instruction from the controller to modify one or more of the aggregation interval and the reporting interval for the group of types of data. Furthermore, the access point may modify one or more of the aggregation interval and the reporting interval based on the instruction.

Note that the access point may be associated with a zone in the WLAN. The zone may include access points having an associated service level agreement with a service provider of the WLAN that specifies a service level of the access points.

Additionally, the instruction may specify, based on the aggregation interval, an aggregation technique used in the aggregation. For example, the instruction may specify, based on the aggregation interval, weights used in a weighted average. The specified weights may avoid data loss in the weighted average by changing a precision of the aggregated data.

In some embodiments, the access point includes a processor and a memory that stores a program module. When executed by the processor, the program module may cause the access point to perform at least the aggregating of the data and the modifying of one or more of the aggregation interval and the reporting interval. Note that the modifying of one or more of the aggregation interval and the reporting interval may occur while the processor executes the program module.

Moreover, after the modifying, the access point may receive, from the input node to the access point, additional data for the type of data, aggregate the additional data, and transmit, to the output node of the access point, the aggregated additional data based on the measurement interval and the modified one or more of the aggregation interval and the reporting interval.

Another embodiment provides a computer-readable storage medium with a program module for use with the access point. When executed by the access point, this program module causes the access point to perform at least some of the aforementioned operations.

Another embodiment provides a method, which may be performed by the access point. This method includes at least some of the aforementioned operations.

Another embodiment provides a controller that dynamically modifies data collection. This controller includes an interface circuit that communicates with an access point in a WLAN. During operation, the controller may receive, from an input to the controller, data for a type of data from an access point based on a reporting interval, where the aggregated data is aggregated based on an aggregation interval, and the reporting interval and the aggregation interval are predefined for a group of types of data that includes the type of data. Then, the controller may store the data in a queue (or multiple queues), and the controller may monitor a length of the queue (or multiple queues). Next, the controller may selectively provide, to an output of the controller and based on the length of the queue (or, when there are multiple queues, a weighted queue length), an instruction to the access point to modify one or more of the aggregation interval and the reporting interval for the group of types of data.

Moreover, after providing the instruction, the controller may receive, from the input node of the controller, additional data for the type of data, store the additional data in the queue, monitor a second length of the queue, and selectively provide, to the output node of the controller, another instruction, based on the monitoring of the second length, to modify one or more of the aggregation interval and the reporting interval.

Furthermore, the access point may be associated with a zone in the WLAN. The zone may include a group of access points having an associated service level agreement with a service provider of the WLAN that specifies a service level of the group of access points. Note that the controller may provide, to the output node of the controller, instructions to access points in different zones for different modifications to one or more of aggregation interval and the reporting interval for the group of types of data.

Additionally, the instruction may specify, based on the aggregation interval, an aggregation technique used in the aggregation. For example, the instruction may specify, based on the aggregation interval, weights used in a weighted average. The specified weights may avoid data loss in the weighted average by changing a precision of the data.

In some embodiments, after providing the instruction, the controller provides, to the output node of the controller, another instruction to restore one or more of the aggregation interval and the reporting interval based on subsequent monitoring of the length of the queue.

Moreover, the controller may process the data in the queue without using a look-up table.

Furthermore, the controller may display information that indicates that the one or more of the aggregation interval and the reporting interval have been modified.

Another embodiment provides a computer-readable storage medium with a program module for use with the controller. When executed by the controller, this program module causes the controller to perform at least some of the aforementioned operations.

Another embodiment provides a method, which may be performed by the controller. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
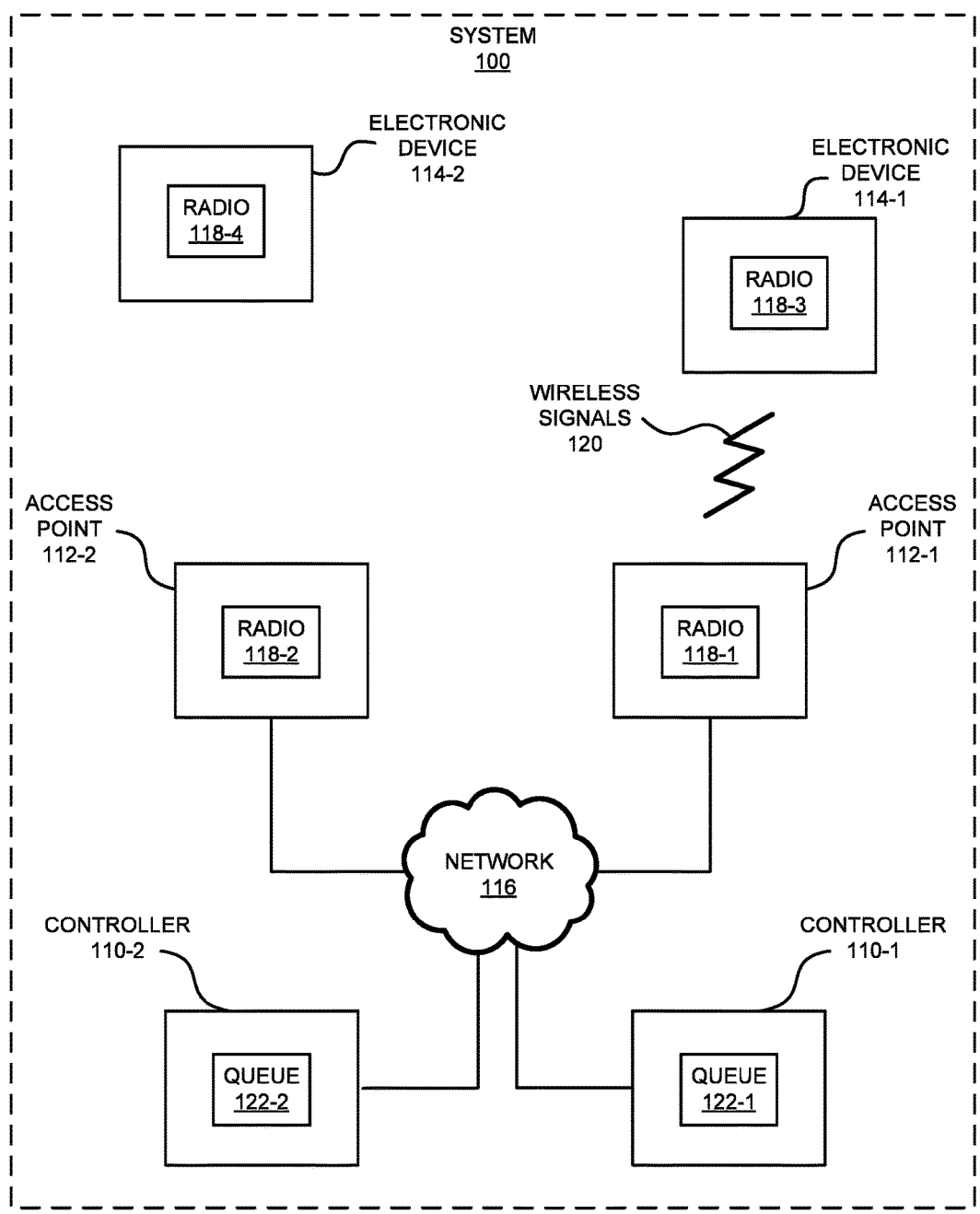
FIG. 1 is a block diagram illustrating communication among controllers, access points and electronic devices in a system that includes a WLAN in accordance with an embodiment of the present disclosure.

A controller and one or more access points that dynamically modify data collection in a system that includes a WLAN is described. In particular, during operation the access point may receive, from an input to the access point, data for a type of data from an electronic device in the WLAN. Then, access point may aggregate the data based on an aggregation interval, where the aggregation interval is predefined for a group of types of data that includes the type of data. Moreover, the access point may transmit, to an output of the access point, the aggregated data for the controller based on a reporting interval, where the reporting interval is predefined for the group of types of data. Next, the access point may receive, from the input to the access point, an instruction from the controller to modify the aggregation interval and/or the reporting interval for the group of types of data. Furthermore, the access point may modify the aggregation interval and/or the reporting interval based on the instruction.

Similarly, during operation the controller may receive, from an input to the controller, the aggregated data from the access point based on the reporting interval, where the aggregated data is aggregated based on an aggregation interval. Then, the controller may store the data in a queue, and the controller may monitor a length of the queue. Based on the length of the queue, the controller may selectively provide, to an output of the controller, the instruction to the access point to modify the aggregation interval and/or the reporting interval for the group of types of data.

By dynamically modifying the aggregation interval and/or the reporting interval, this data-collection technique may allow dynamic modification of data collection in the WLAN. Moreover, the dynamic modification may avoid data loss (e.g., due to buffer or queue overflow in the controller) by varying the data precision, and in particular the temporal precision of the data. Consequently, this capability may allow data-collection technique to be scaled to very large networks, with multiple WLANs and clients or electronic devices running or executing a large number of applications, without adversely impacting the data collection. Furthermore, by avoiding data loss, the data-collection technique may improve the accuracy of the collected data, which may allow a network administrator to collect the data they need to appropriately manage the WLAN and to ensure high-quality communication performance. Therefore, the data-collection technique may improve the user experience when communicating with the access point via the WLAN.

In the discussion that follows, the electronic device and the access point communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used.

Moreover, the access point may communicate with other access points and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of a system 100 with communication among one or more controllers 110, one or more access points 112 and one or more electronic devices 114 (such as a cellular telephone) in accordance with some embodiments. In particular, controllers 110 may communicate with each other and/or with access points 112 using wired communication, and access points 112 may communicate with each other using wireless and/or wired communication. Note that one or more of controllers 110 may be used to: monitor one or more of access points 112, provide alarms/event notifications based on the monitoring, and/or configure one or more of access points 112. Moreover, note that access points 112 may include a physical access point and/or a virtual access point that is implemented in software in an environment of an electronic device or a computer. In addition, at least some of access points 112 may communicate with electronic devices 112 using wireless communication.

The wired communication among controllers 110 and/or access points 112 may occur via network 116 (such as an intra-net, a mesh network, point-to-point connections and/or the Internet) and may use a network communication protocol, such as Ethernet. (While FIG. 1 illustrates system 100 including network 116, in other embodiments network 116 is external to system 100.) Moreover, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wireless communication among controllers 110 and/or access points 112 also involves the use of dedicated connections, such as via a peer-to-peer (P2P) communication technique.

Figure 7:
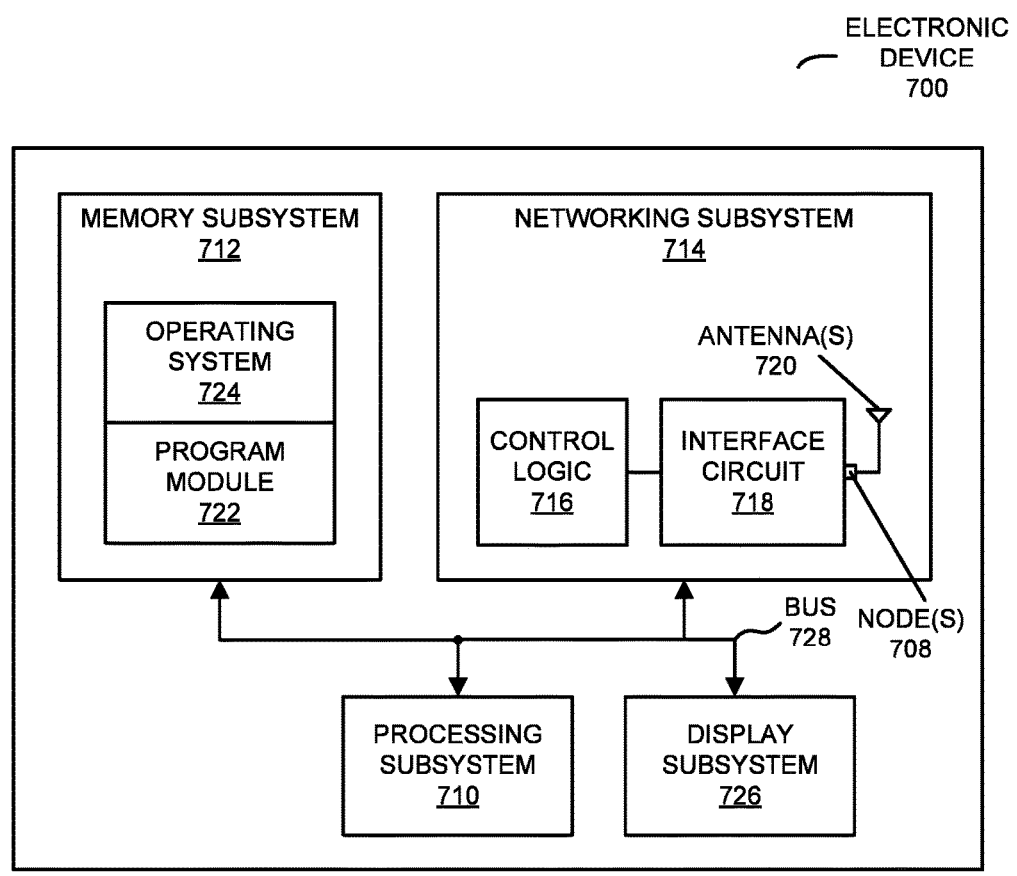
FIG. 7 is a block diagram illustrating an electronic device in accordance with an embodiment of the present disclosure.

As described further below with reference to FIG. 7, controllers 110, access points 112 and/or electronic devices 114 may include subsystems, such as a networking subsystem, a memory subsystem and a processor subsystem. In addition, access points 112 and electronic devices 114 may include radios 118 in the networking subsystems. More generally, access points 112 and electronic devices 114 can include (or can be included within) any electronic devices with the networking subsystems that enable access points 112 and electronic devices 114 to communicate with each other using wireless and/or wired communication. This wireless communication can comprise transmitting advertisements on wireless channels to enable access points 112 and/or electronic devices 114 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 118 are shown in access points 112 and electronic devices 114, one or more of these instances may be different from the other instances of radios 118.

As can be seen in FIG. 1, wireless signals 120 (represented by a jagged line) are transmitted from radio 118-1 in access point 112-1. These wireless signals may be received by radio 118-3 in electronic device 114-1. In particular, access point 112-1 may transmit frames or packets. In turn, these frames or packets may be received by electronic device 114-1. Moreover, access point 112-1 may allow electronic device 114-1 to communicate with other electronic devices, computers and/or servers via network 116.

Note that the communication among controllers 110, access points 112 and/or electronic devices 114 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 112 and electronic devices 114 includes: receiving wireless signals 120 with the packet or frame; decoding/extracting the packet or frame from received wireless signals 120 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, it can be difficult to scale data collection in system 100 to include a large number of access points 112, electronic devices 114 and different applications and/or different versions of the applications without adversely impacting or delaying the data-collection time. This challenge may be addressed using the data-collection technique.

In particular, one or more of controllers 110 (which are sometimes referred to as a 'controller cluster') can support tens of thousands of access points 112, which in turn support hundreds of thousands of clients or electronic devices 114. Moreover, each of electronic devices 114 can run a hundred applications. Using hardware and/or software, the one or more controllers 110 may implement a network management system that collects data and statistics, which can be used by network or client administrators. Note that system 100 may include multiple WLANs, which may be associated with different locations and different service providers.

Based on the data traffic in system 100, different types of data that are collected in system 100 may be identified or specified in an attribute list, which may include the data key(s) and their associated properties. For example, a type of data may be 'transmit power' of a radio (such as radio 118-1) and the associated property may be a 'floating-point number.' (More generally, the type of data may include a wide variety of performance metrics, which may be associated with one or more layers in an Open System Interconnection model. For example, the type of data may be associated with a physical layer, a MAC layer, an application layer, a performance metric associated with wireless communication, etc.) At development time, the attribute list and a history of the time evolution of the data may be used to: determine a schema for a database that stores the collected data received by the one or more controllers 110, executable files for processing the collected data (such as determining statistical values based on the collected data), and/or user-interface widgets that can be used to display information associated with or based on the collected data.

Moreover, as described further below with reference to FIG. 5, the different types of data in system 100 may be divided or assigned to different buckets or groups of types of data. The types of data in each bucket may have predefined values for data collection parameters, including: a measurement interval or MI (such as a time between measurements by access points 112 and/or electronic devices 114), an aggregation interval or AI (such as a time interval during which measurements are averaged or weighted averaged), and a reporting interval or RI (such as time interval between uploads of aggregated data from access points 112 to one or more of controllers 110). For example, based on the predefined values, the types of data in one of the buckets may each be measured by electronic devices 114 and communicated to a given access point every 30 s (i.e., MI may be 30 s), three of these measurements may be averaged together by the given access point (i.e., AI may be 90 s), and the given access point may transmit the aggregated data to one or more of controllers 110 every 90 s (i.e., RI may be 90 s).

However, if system 100 is unable to scale, then if all of access points 112 attempt to concurrently communicate the aggregated data to one or more of controllers 110, the one or more of controllers 110 may not be able to accommodate or handle all of the data at once. One approach is to have one or more of controllers 110 drop aggregated data, as the cost of reducing the accuracy of the collected data and the summary statistics. Alternatively, the reporting of the aggregated data by different access points 112 may be spread out in time. For example, after the RI since a previous transmission of aggregated data has elapsed, access points 112 may stagger the reporting of the aggregated data over 15 min. This approach increases the effective RI (in this example, by, on average, an additional 7.5 min). While this increase in RI can alleviate the peak demands on the one or more of controllers 110 during the data collection in system 100, the temporal precision or sampling rate is degraded, which may also adversely impact the collected data and the summary statistics. In addition, the staggering of the reporting by the different access points 112 in this example is static, and thus does not adapt to changes in system 100.

Figure 2:
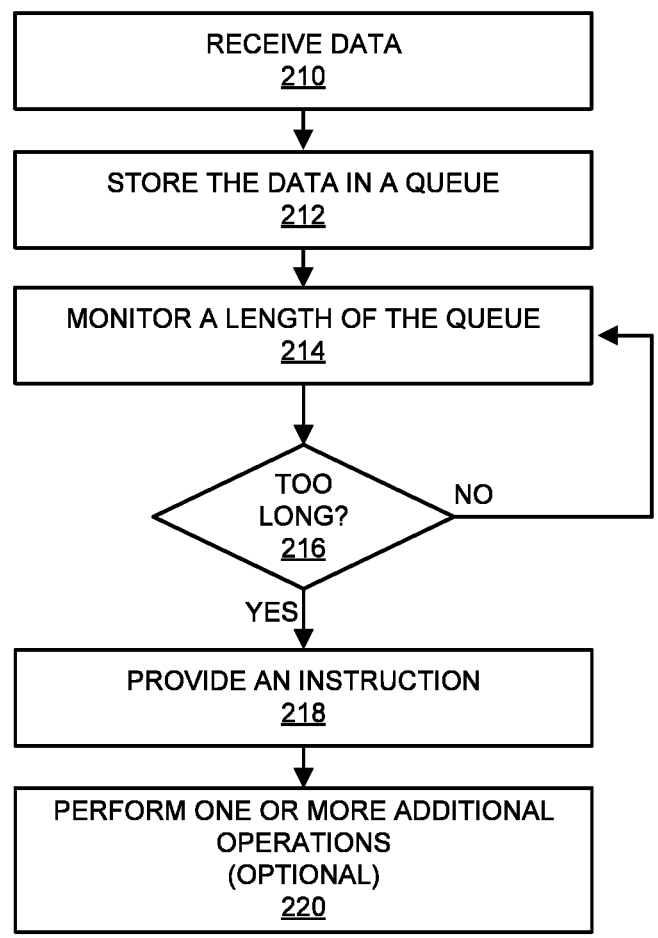
FIG. 2 is a flow diagram illustrating a method for dynamically modifying data collection in the system in FIG. 1 in accordance with an embodiment of the present disclosure.

As described below with reference to FIGS. 2-4, these challenges may be addressed using the data-collection technique. In particular, controllers 110 may store aggregated data received from access points 112 in one or more queues 122 prior to subsequent processing (such as the determination of statistics based on the received aggregated data). For example, one or more types of data associated with different buckets may be assigned to different queues 122.

If a queue (such as queue 122-1) is filling up (such as more than 50, 60 or 75% full), a given controller (such as controller 110-1) may change the assigned values of one or more of the data-collection parameters for a bucket that includes a type of data in queue 122-1. (More generally, using the communication technique, controller 110-1 may scale out a network edge.) Thus, controller 110-1 may change the assigned values of MI, AI and/or RI for the types of data in this bucket. Then, controller 110-1 may communicate the change(s) in the data-collection parameters to access points 112.

For example, controller 110-1 may provide an instruction to access point 112-1 to change or modify AI and/or RI. In particular, when a length of queue 122-1 exceeds a threshold value (such as 75% of a maximum length), AI may increase from a time interval corresponding to three samples or measurements to a time interval corresponding to 18 samples or measurements and/or RI may increase from 3 min. to 15 min. Based on the instruction, access point 112-1 may modify AI and/or RI, and then may accordingly aggregate data and/or report aggregated data to controller 110-1.

Subsequently, if the length of queue 122-1 is reduced (such as less than 60% of a maximum length), controller 110-1 may provide another instruction to access point 112-1 to change or modify AI and/or RI. For example, access point 112-1 may be instructed to decrease RI from 15 min to 9 min. In response, access point 112-1 may modify AI and/or RI, and then may accordingly aggregate data and/or report aggregated data to controller 110-1.

Similarly, if the length of queue 122-1 is further reduced (such as less than 50% of the maximum length), controller 110-1 may provide another instruction to access point 112-1 to change or modify AI and/or RI. For example, access point 112-1 may be instructed to restore the original values of the data-collection parameters assigned to the types of data that are associated with the bucket or group (such as AI equal to a time interval corresponding to three samples or measurements and/or RI equal to 3 min.). In response, access point 112-1 may once again modify AI and/or RI, and then may accordingly aggregate data and/or report aggregated data to controller 110-1.

In these ways, the data-collection technique may allow controller 110-1 and access point 112-1 (and, more generally, system 100) to dynamically adapt to changes in system 100, such as the volume of data being collected and/or delays in processing the data. In particular, the backpropagation from controllers 110 to access points 112 may be used to inform access points 112 of dynamic changes in the data-collection parameters, such as MI, AI and/or RI. Note that by changing the data-collection parameters of all of the types of data in a bucket or a group, the data-collection technique may allow the dynamic modification of the data collection to be performed efficiently, such as without using a look-up table. Therefore, the data-collection technique may facilitate real-time, scalable data collection.

As described further below with reference to FIG. 6, in some embodiments at least some of access points 112 are associated with one or more zones in a WLAN and/or system 100. In particular, a zone may include access points having an associated service level agreement (SLA) with a service provider of the WLAN that specifies a service level of the access points. Moreover, the one or more controllers 110 may modify the data-collection parameters of one or more buckets or groups of types of data based on the zones. Consequently, controller 110-1 may provide, to access points 112 in different zones, instructions for different modifications to one or more of AI and/or RI for the bucket or group of types of data.

For example, when the length of queue 122-1 increases above a threshold value, AI and/or RI may be increased for the bucket for those access points in a zone having a lower service level than other zones. In particular, the SLA for the zone may specify that AI and/or RI for the access points in the zone may be increased when there is high data traffic in system 100. Alternatively, the SLA may not contain the same quality-of-service guarantees that are includes in the SLAs for another zone.

Therefore, in some embodiments, the data-collection technique allows the different dynamic control or throttling of the data collection for different classes of users in different zones.

We now describe embodiments of the method. FIG. 2 presents a flow diagram illustrating an example of a method 200 for dynamically modifying data collection by a controller, such as one of controllers 110 in FIG. 1. During operation, the controller may receive, from an access point, data (operation 210) for a type of data based on a reporting interval, where the aggregated data is aggregated based on an aggregation interval, and the reporting interval and the aggregation interval are predefined for a group of types of data that includes the type of data. Then, the controller may store the data in a queue (operation 212), and the controller may monitor a length of the queue (operation 214). For example, the controller may determine whether the long exceeds a threshold value (operation 216), i.e., whether the length is too long. Next, the controller may selectively provide, based on the length of the queue, an instruction (operation 218) to the access point to modify one or more of the aggregation interval and the reporting interval for the group of types of data.

In some embodiments, the controller optionally performs one or more additional operations (operation 220). For example, after providing the instruction (operation 218), the controller may: receive additional data for the type of data, store the additional data in the queue, monitor a second length of the queue, and selectively provide another instruction, based on the monitoring of the second length, to modify one or more of the aggregation interval and the reporting interval.

Furthermore, the access point may be associated with a zone in at least a WLAN. The zone may include a group of access points having an associated SLA with a service provider of the WLAN that specifies a service level of the group of access points. Note that the controller may provide, to access points in different zones, instructions for different modifications to one or more of aggregation interval and the reporting interval for the group of types of data.

Additionally, the instruction may specify, based on the aggregation interval, an aggregation technique used in the aggregation. For example, the instruction may specify, based on the aggregation interval, weights used in a weighted average. The specified weights may avoid data loss in the weighted average by changing a precision of the data, such as a temporal precision or a sampling rate.

In some embodiments, after providing the instruction (operation 216), the controller provides another instruction to restore one or more of the aggregation interval and the reporting interval based on subsequent monitoring of the length of the queue.

Moreover, the controller may process the data in the queue without using a look-up table. This may include the selective providing of the instruction (operation 216) and/or additional processing of the data (such as calculating summary statistics based on the data).

Furthermore, the controller may display information that indicates that the one or more of the aggregation interval and the reporting interval have been modified. For example, the displayed information may indicate the AI and/or RI values for the type of data. Alternatively or additionally, the displayed information may indicate the temporal granularity and update times for the type of data. This displayed information may allow a network or client administration to understand dynamic changes in the temporal precision of the displayed data and/or summary statistics.

Figure 3:
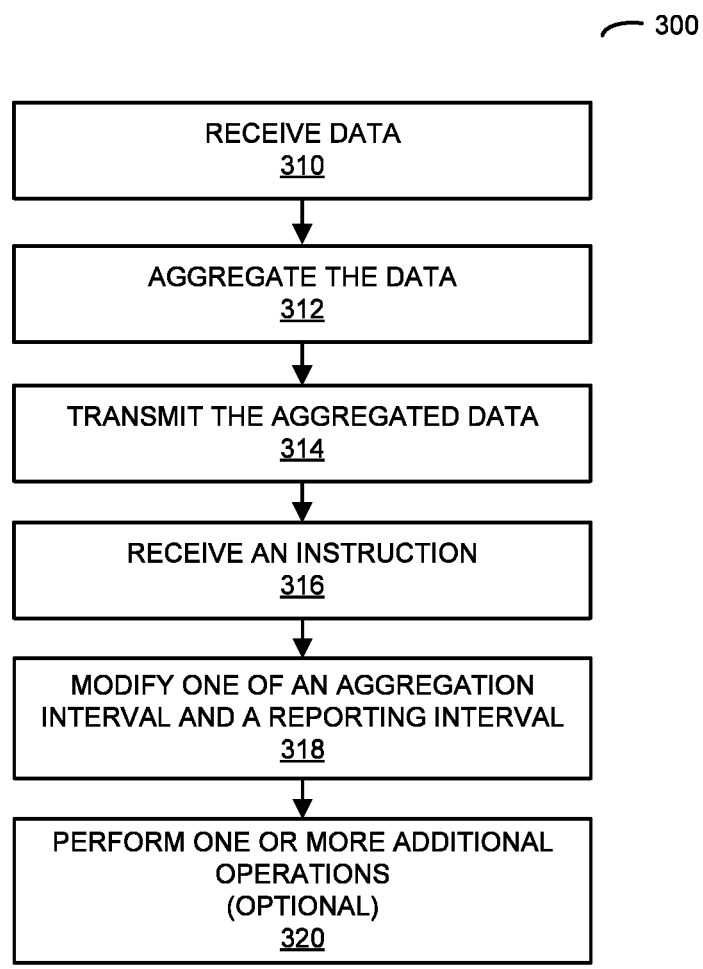
FIG. 3 is a flow diagram illustrating a method for dynamically modifying data collection in the system in FIG. 1 in accordance with an embodiment of the present disclosure.

FIG. 3 presents a flow diagram illustrating an example of a method 300 for dynamically modifying data collection by an access point, such as one of access points 112 in FIG. 1. During operation, the access point may receive data (operation 310) for a type of data from an electronic device based on a measurement interval, where the measurement interval is predefined for a group of types of data that includes the type of data. Then, the access point may aggregate the data (operation 312) based on an aggregation interval, where the aggregation interval is predefined for the group of types of data. Moreover, the access point may transmit the aggregated data (operation 314) to a controller based on a reporting interval, where the reporting interval is predefined for the group of types of data. Next, the access point may receive an instruction (operation 316) from the controller to modify one or more of the aggregation interval and the reporting interval for the group of types of data. Furthermore, the access point may modify one or more of the aggregation interval and the reporting interval (operation 318) based on the instruction.

In some embodiments, the access point optionally performs one or more additional operations (operation 320). For example, after the modifying (operation 318), the access point may receive additional data for the type of data, aggregate the additional data, and transmit the aggregated additional data based on the measurement interval and the modified one or more of the aggregation interval and the reporting interval. Furthermore, the instruction may specify, based on the aggregation interval, an aggregation technique used in the aggregation (operation 312). For example, the instruction may specify, based on the aggregation interval, weights used in a weighted average. The specified weights may avoid data loss in the weighted average by changing a precision of the aggregated data. Note that the access point may be associated with a zone in the WLAN. The zone may include access points having an associated SLA with a service provider of the WLAN that specifies a service level of the access points.

In some embodiments of methods 200 (FIG. 2) and/or 300, there may be additional or fewer operations. Furthermore, the order of the operations may be changed, and/or two or more operations may be combined into a single operation. For example, the access point may receive the data (operation 310) in response to a request for a measurement of the type of data that is provided by the access point to the electronic device based on the measurement interval. Moreover, the controller may store the data in multiple queues, and may monitor the lengths of these queues. Then, based on the lengths of the queues (or a weighted queue length that is based on the lengths of the queues and associated weights), the controller may selectively provide the instruction.

Figure 4:
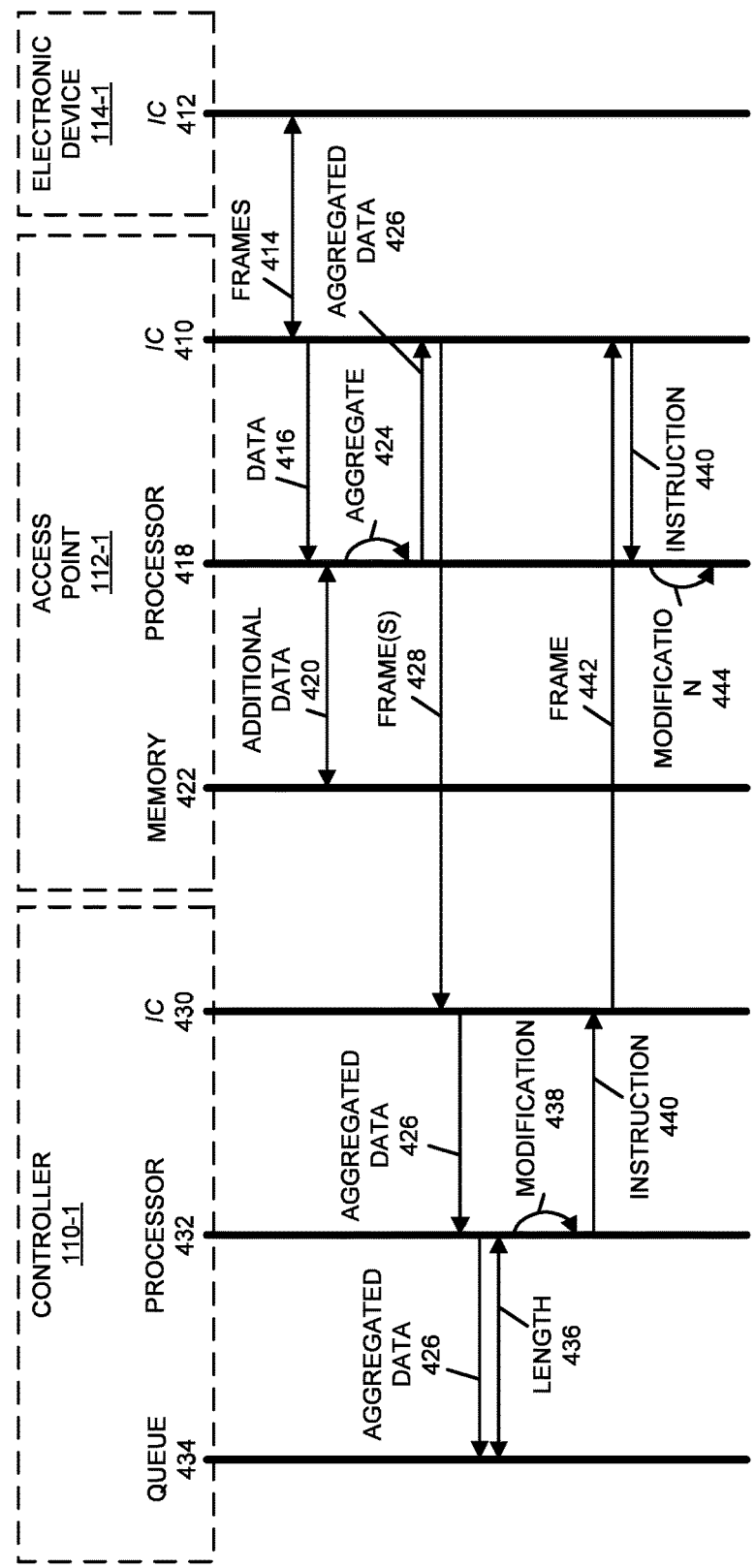
FIG. 4 is a drawing illustrating communication among the electronic devices in FIG. 1 in accordance with an embodiment of the present disclosure.

FIG. 4 presents a drawing illustrating an example of communication among controller 110-1, access point 112-1 and electronic device 114-1. In FIG. 4, an interface circuit (IC) 410 in access point 112-1 may communicate with interface circuit 412 in electronic device 114-1 to receive measurement data 416 for a type of data at a measurement interval. For example, interface circuit 410 may transmit one of frames 414 requesting data 416 and may receive another of frames 414 with measurement data 416 in response.

Then, processor 418 in access point 112-1 may aggregate 424 data 416 with additional previous instances of data 420 for the type of data (which may be stored in memory 422 in access point 112-1) based on an aggregation interval and/or an aggregation technique. Next, interface circuit 410 may transmit aggregated data 426 to controller 110-1 in one or more frames 428.

After receiving the one or more frames 428, interface circuit 430 in controller 110-1 may forward aggregated data 426 to processor 432, which may forward aggregated data 426 to queue 434. Moreover, processor 432 may monitor a length 436 of queue 434. Based on length 436, processor 432 may selectively modify 438 one or more data-collection parameters (such as MI, AI and/or RI). Then, interface circuit 430 may communicate an instruction 440 specifying modification 438 in frame 442.

After receiving frame 442, interface circuit 410 may forward instruction 440 to processor 418, which may modify 444 the data-collection parameters. In this way, subsequent collection of the type of data from electronic device 114-1, aggregation of the type of data by access point 112-1 and/or reporting of aggregated data to controller 110-1 may be dynamically modified based on the revised data-collection parameters until controller 110-1 provides additional instructions that revise the data-collection parameters.

Figures 5, 6:
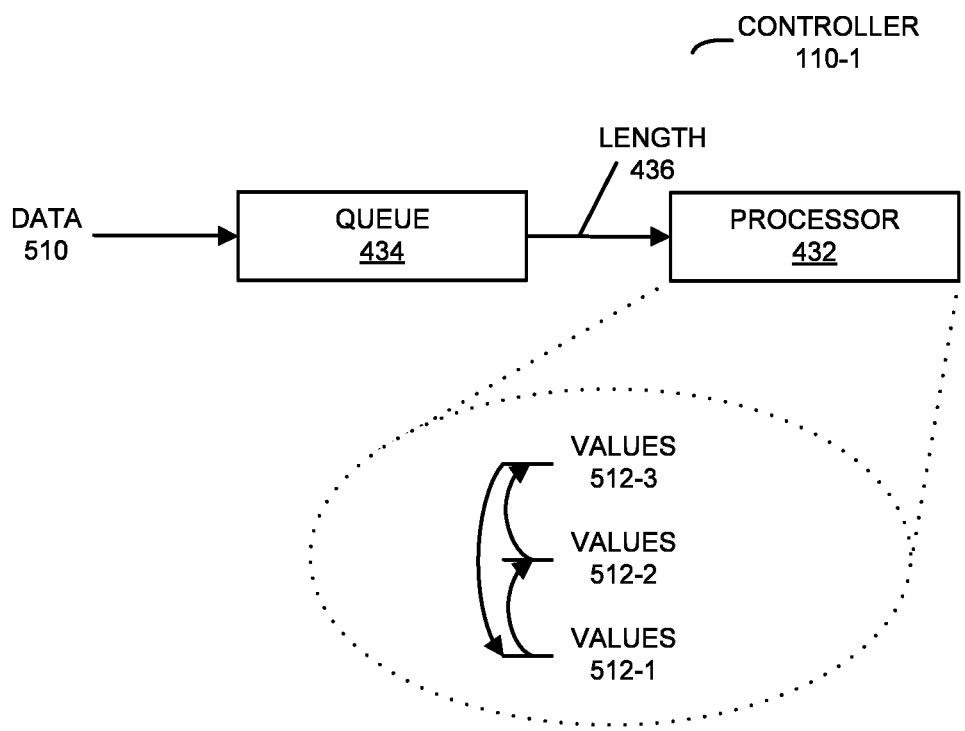
FIG. 5 is a drawing illustrating dynamic data collection in the system of FIG. 1 in accordance with an embodiment of the present disclosure.
FIG. 6 is a drawing illustrating arranging access points into zones in accordance with an embodiment of the present disclosure.

FIG. 5 presents a drawing illustrating an example of dynamic data collection in system 100 (FIG. 1). In particular, data 510 received by controller 110-1 from access point 112-1 may be stored in queue 434. Based on length 436 of queue 434, processor 432 may select data-collection parameters (such as MI, AI and/or RI). For example, as shown in FIG. 5, there may be multiple threshold values that the define different values of the data-collection parameters. When length 436 exceeds a first threshold value (such as 60% of a maximum length), the data-collection parameters may throttle data collection by changing AI and/or RI from initial values 512-1 to values 512-2. Subsequently, when length 436 is greater than a second threshold value (such as 75% of a maximum length), the data-collection parameters may further decrease data collection by changing AI and/or RI from values 512-2 to values 512-3. Furthermore, when length 436 is less than a third threshold value (such as 50% of a maximum length), the data-collection parameters may increase data collection by changing AI and/or RI from values 512-3 back to the initial values 512-1. This data-driven approach may allow the dynamic data-collection changes to be implemented at runtime (e.g., without changing the source code).

As noted previously, access points in the system may be grouped based on different service tiers associated with different SLAs. This may allow different segments of a network to generate data at different dynamic rates. FIG. 6 presents a drawing illustrating an example of arranging access points 612 into zones 610, which are associated with SLAs 614. When the data collection needs to be dynamically throttled (such as based on the length of the queue(s)), zones with SLAs that allow such changes may be the ones that are first throttled. Thus, the changes to the data-collection parameters for a bucket of group of types of data may be first applied to access points 612-1 in zone 610-1 and access points 612-3 in zone 610-3, while the data-collection parameters the bucket or group of types of data for access points 612-2 in zone 610-2 may be unchanged.

In some embodiments, access points, data planes and controller nodes generate monitoring data to facilitate network operations and capacity planning. In existing systems, the data collection may involve different interfaces between the electronic devices and the access points, the access points and the controllers, and the controllers and data structures that store the data. Moreover, in existing systems the names and/or formats of the data in different components may be different. Furthermore, the different components may collect data independently from each other at different rates. This disparity in existing systems can result in duplicated effort and inconsistent data across the existing systems, which can be frustrating for customers and can make it difficult to effectively troubleshoot network issues.

These challenges may be addressed in the data-collection technique using a data-driven network collection and export. In particular, in a system (such as system 100 in FIG. 1) a single source of truth (i.e., the attribute list) may drives data collection and data consumption. In the process, feature duplication may be eliminated, because there is only one collection engine or pipeline. Moreover, the data may be formalized using a backward-compatible-schema, so that it can be used internal to and external to the system. These capabilities may reduce vendor integration time. Furthermore, the characteristics of network data may be manipulated or changed at runtime, such as: how often the data is measured, how often the data needs to be aggregated, and how often the data is transmitted by the access points to one or more of the controllers. As discussed previously, each of the data-collection parameters may be configured at runtime. This differentiation allows system 100 to dynamically modify the data collection and consumption based on resource availability at either side. Thus, if a consumer of data backs up, it can tell the collection engine to slow down the reporting interval, etc.

The data-collection technique may be facilitated by a monitoring data-collection infrastructure in the system, including: a single source of truth, such as metadata that can drive the data collection and the data consumption; a message structure that is version aware to ensure backward compatibility; a data-collection engine or program module that can collect/process data at runtime based on the data-collection parameters; and a streaming interface that can supply streaming data to external consumers (so that the data-collection technique can scale up).

In some embodiments, the metadata in the attribute list is based on eXtensible Markup Language (XML) tags that drive the data collection and various interfaces in the system.

The data-collection technique may provide consistent interfaces and may eliminate duplicate efforts when generating monitoring data. Moreover, the data-collection parameters may allow dynamic changes to be implemented at runtime. Furthermore, these capabilities may facilitate increased feature velocity and may enable integration with external customers (such as service providers, cloud providers, etc.). Additionally, the data-collection technique may facilitate resource balancing (such as processor and/or memory) across the system.

We now describe embodiments of an electronic device, which may perform at least some of the operations in the data-collection technique. FIG. 7 presents a block diagram illustrating an electronic device 700 in accordance with some embodiments, such as one of controllers 110, access points 112 or electronic devices 114. This electronic device includes processing subsystem 710, memory subsystem 712, and networking subsystem 714. Processing subsystem 710 includes one or more devices configured to perform computational operations. For example, processing subsystem 710 can include one or more microprocessors, ASICs, microcontrollers, programmable-logic devices, and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory. In some embodiments, instructions for processing subsystem 710 in memory subsystem 712 include: one or more program modules or sets of instructions (such as program module 722 or operating system 724), which may be executed by processing subsystem 710. Note that the one or more computer programs or program modules may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as nodes 708, e.g., a pad, which can be coupled to the one or more antennas 720. Thus, electronic device 700 may or may not include the one or more antennas 720. Note that the one or more nodes 708 may constitute input(s) to and/or output(s) from electronic device 700.) For example, networking subsystem 714 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 700 may be adapted or changed using pattern shapers (such as reflectors) in one or more antennas 720 (or antenna elements), which can be independently and selectively electrically coupled to ground to steer the transmit antenna pattern in different directions. Thus, if one or more antennas 720 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 700 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program module 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 714. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and a Wi-Fi communication protocol as an illustrative example, in other embodiments a wide variety of communication protocols and, more generally, wireless communication techniques may be used. Thus, the data-collection technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the data-collection technique may be implemented using program module 722, operating system 724 (such as a driver for interface circuit 718) or in firmware in interface circuit 718. Note that the modifying of one or more of the aggregation interval and the reporting interval may occur while processing system 710 executes program module 722. Thus, the data-collection technique may be implemented at runtime of program module 722. Alternatively or additionally, at least some of the operations in the data-collection technique may be implemented in a physical layer, such as hardware in interface circuit 718.

Moreover, while the preceding embodiments illustrated the data-collection technique while an access point receives a frame or a packet from an electronic device, in some embodiments the access point may concurrently receive frames or packets from two or more electronic devices. For example, the communication protocol in a WLAN may use orthogonal frequency division multiple access (OFDMA).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
an interface circuit configured to wirelessly communicate with a controller and an electronic device in a wireless local area network (WLAN), wherein the access point is configured to:
   receive, from an input to the access point, data for a type of data associated with the electronic device based at least in part on a measurement interval, wherein the measurement interval is predefined for a group of types of data that comprises the type of data;
   aggregate the data based at least in part on an aggregation interval, wherein the aggregation interval is predefined for the group of types of data;
   transmit, to an output node of the access point, the aggregated data for the controller based at least in part on a reporting interval, wherein the reporting interval is predefined for the group of types of data;
   receive, from the input to the access point, an instruction associated with the controller to modify one or more of the aggregation interval and the reporting interval for the group of types of data, wherein the instruction specifies, based at least in part on the aggregation interval, an aggregation technique used in the aggregation; and
   modify one or more of the aggregation interval and the reporting interval based at least in part on the instruction.

2. The access point of claim 1, wherein the access point is associated with a zone in the WLAN; and wherein the zone comprises access points having an associated service level agreement with a service provider of the WLAN that specifies a service level of the access points.

3. The access point of claim 1, wherein the instruction specifies, based at least in part on the aggregation interval, weights used in a weighted average.

4. The access point of claim 3, wherein the specified weights avoid data loss in the weighted average by changing a precision of the aggregated data.

5. The access point of claim 1, wherein the access point comprises:
a processor; and
a memory, coupled to the processor, which stores program instructions, wherein, when executed by the processor, the program instructions cause the access point to perform at least the aggregating of the data and the modifying of one or more of the aggregation interval and the reporting interval.

6. The access point of claim 5, wherein the modifying of one or more of the aggregation interval and the reporting interval occurs while the processor executes the program instructions.

7. The access point of claim 1, wherein, after the modifying, the access point is configured to receive, from the input to the access point, additional data for the type of data, aggregate the additional data, and transmit, to the output node of the access point, the aggregated additional data based at least in part on the measurement interval and the modified one or more of the aggregation interval and the reporting interval.

8. A method for dynamically modifying data collection, comprising:
by an access point:
receiving, from an input to the access point, data for a type of data associated with an electronic device in a wireless local area network (WLAN) based at least in part on a measurement interval, wherein the measurement interval is predefined for a group of types of data that comprises the type of data;
aggregating the data based at least in part on an aggregation interval, wherein the aggregation interval is predefined for the group of types of data;
transmitting, to an output node of the access point, the aggregated data for the controller based at least in part on a reporting interval, wherein the reporting interval is predefined for the group of types of data;
receiving, from the input to the access point, an instruction associated with the controller to modify one or more of the aggregation interval and the reporting interval for the group of types of data, wherein the instruction specifies, based at least in part on the aggregation interval, an aggregation technique used in the aggregation; and
modifying one or more of the aggregation interval and the reporting interval based at least in part on the instruction.

9. The method of claim 8, wherein the access point is associated with a zone in the WLAN; and
wherein the zone comprises access points having an associated service level agreement with a service provider of the WLAN that specifies a service level of the access points.

10. The method of claim 8, wherein the method comprises:
receiving, from the input to the access point and after the modifying, additional data for the type of data;
aggregating the additional data; and
transmitting, to the output node of the access point, the aggregated additional data based at least in part on the measurement interval and the modified one or more of the aggregation interval and the reporting interval.

11. A controller, comprising:
an interface circuit configured to wirelessly communicate with an access point in a wireless local area network (WLAN), wherein the controller is configured to:
receive, from an input node to the controller, data for a type of data associated with the access point based at least in part on a reporting interval, wherein the data is aggregated based at least in part on an aggregation interval and the reporting interval, and the aggregation interval are predefined for a group of types of data that comprises the type of data;
storing the data in a queue;
monitoring a length of the queue; and
selectively providing, to an output node of the controller and based at least in part on the length of the queue, an instruction for the access point to modify one or more of the aggregation interval and the reporting interval for the group of types of data.

12. The controller of claim 11, wherein, after providing the instruction, the controller is configured to: receive, from the input node of the controller, additional data for the type of data, store the additional data in the queue, monitor a second length of the queue, and selectively provide, to the output node of the controller, another instruction, based at least in part on the monitoring of the second length, to modify one or more of the aggregation interval and the reporting interval.

13. The controller of claim 11, wherein the access point is associated with a zone in the WLAN; and
wherein the zone comprises a group of access points having an associated service level agreement with a service provider of the WLAN that specifies a service level of the group of access points.

14. The controller of claim 13, wherein the controller is configured to provide, to the output of the controller, instructions for access points in different zones for different modifications to one or more of aggregation interval and the reporting interval for the group of types of data.

15. The controller of claim 11, wherein the instruction specifies, based at least in part on the aggregation interval, an aggregation technique used in the aggregation.

16. The controller of claim 11, wherein the instruction specifies, based at least in part on the aggregation interval, weights used in a weighted average.

17. The controller of claim 16, wherein the specified weights avoid data loss in the weighted average by changing a precision of the data.

18. The controller of claim 11, wherein, after providing the instruction, the controller is configured to provide, to the output node of the controller, another instruction to restore one or more of the aggregation interval and the reporting interval based at least in part on subsequent monitoring of the length of the queue.

19. The controller of claim 11, wherein the controller is configured to process the data in the queue without using a look-up table.

20. The controller of claim 11, wherein the controller is configured+display information that indicates that the one or more of the aggregation interval and the reporting interval have been modified.

* * * * *